United States Patent [19]

Stalberg

[11] 4,447,774
[45] May 8, 1984

[54] VIDEO SIGNAL DETECTOR

[75] Inventor: Nils G. Stalberg, Lidingo, Sweden

[73] Assignee: International Business Machines Corporation, Armonk, N.Y.

[21] Appl. No.: 306,632

[22] Filed: Sep. 28, 1981

[30] Foreign Application Priority Data

Oct. 8, 1980 [SE] Sweden ................................. 8007037

[51] Int. Cl.³ .......................... H03K 5/05; H03K 5/153
[52] U.S. Cl. ..................................... 328/150; 307/311;
307/354; 307/358; 382/25; 382/65
[58] Field of Search ............... 307/358, 351, 354, 360,
307/261, 311; 328/151, 117, 146–149, 150;
340/146.3 AC, 146.3 AE, 146.3 AG

[56] References Cited

U.S. PATENT DOCUMENTS

| 3,566,281 | 2/1971 | Baumann | 328/171 |
| 3,599,151 | 8/1971 | Harr | 340/146.3 AG |
| 3,912,943 | 10/1975 | Wilson | 307/235 |
| 4,121,121 | 10/1978 | Gabeler et al. | 307/358 |
| 4,227,218 | 10/1980 | Vandling | 358/282 |

OTHER PUBLICATIONS

K. S. Pennington, R. E. Shirley and D. A. VanHook, Circuit for Obtaining Variable Resolution Output from Linear Array Scanner, IBM TDB, vol. 21, No. 7, Dec. 1978, pp. 2684–2685.
W. R. Yount, Thresholding Circuit, IBM TDB, vol. 20, No. 8, Jan. 1967, pp. 3199–3200.
M. M. Siverling, Thresholder for Optical Scanners, IBM TDB, vol. 16, No. 8, Jan. 1974, pp. 2746–2747.
R. E. Penny, Dynamic Threshold Setting Circuit, IBM TDB, vol. 18, No. 6, Nov. 1975, pp. 1962–1965.

Primary Examiner—John Zazworsky
Attorney, Agent, or Firm—E. Ronald Coffman

[57] ABSTRACT

A video detector circuit is disclosed which develops a threshold level from a white or background peak signal in regions of low contrast, and from a combination of both white and black peak levels in regions of high contrast. The circuit is adjustable to compensate for variable affection performance of the detector.

7 Claims, 4 Drawing Figures

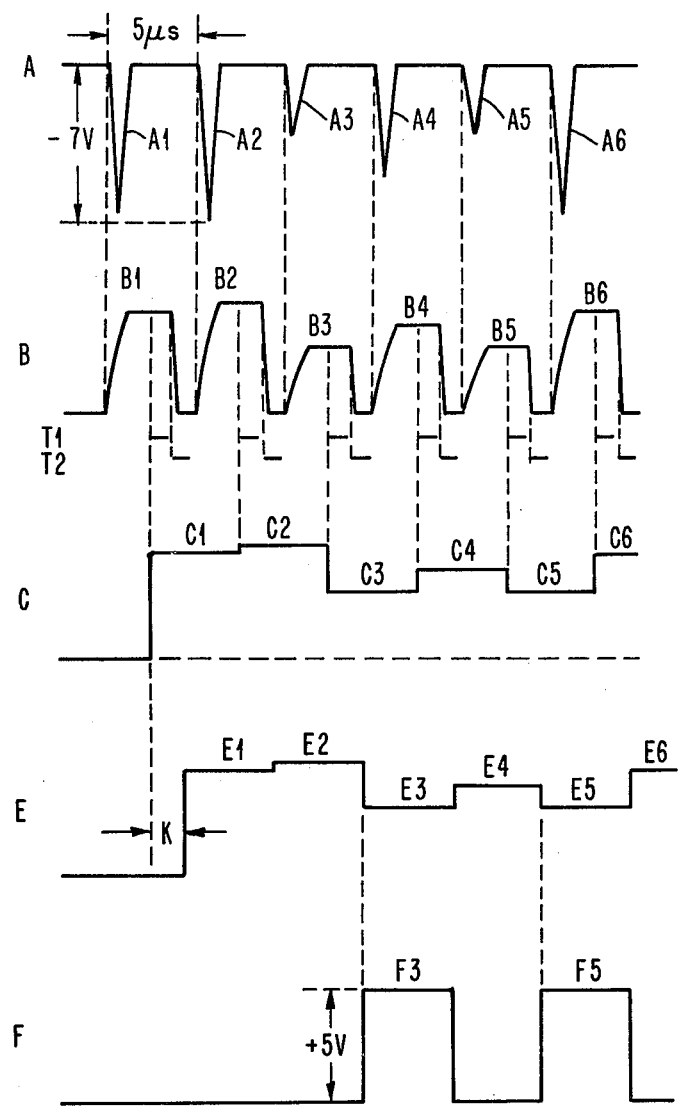

VIDEO SIGNAL DETECTOR

The present invention relates to a video signal detector and more specifically to a device for converting an analog video input signal into the digital output signal.

In optical document readers, the optical detector is usually a photo multiplier tube or a string of light-sensitive diodes that detect the reflected light from a passing illuminated document. The detected signals are amplified and gated into a threshold circuit functioning as a video signal detector, whereupon the detected digital video signals are gated through a memory to a character recognition device. In this way, it is possible to read and recognize the text of a document to be forwarded to a user unit.

One example of a video signal detector in such a system for optical document reading is shown in the U.S. Pat. No. 3,912,943. According to this patent, a signal threshold circuit is used to distinguish an input analog high white signal level from an input low black signal level, the output of the circuit delivering a digital "one" signal for the high white level and a "zero" signal for the low black level. A threshold level is used to detect white "one" signals. This threshold level is adjusted dynamically in response to a white peak signal and a black peak signal, as well as through a jump circuit that considers the momentaneous fall of the white peak signal. Through this dynamic change of the threshold level, the device is able to detect video signal curves of different quality without erroneous detection caused by direct noise.

Recently, there has been an increasing use, in banks or similar institutions, of document readers that read the characters optically, e.g., small and simple terminal computers for the optical reading of checks and other documents of varying quality. Such terminals require a video detector, having a simple technical construction but still able to detect all types of existing video signals, for instance, high contrast signals, low contrast signals and signals from both dark and light characters.

SUMMARY OF THE INVENTION

The above problems are solved, according to this invention, by means of a video signal detector that uses comparatively simple and cheap electronic components wherein a threshold level is defined by reference to a white peak detector in regions of low contrast, and by reference to both white and black peak detectors in regions of high contrast. The circuit is adjustable to provide for optical black-white discrimination with a minimum of interferene from noise.

The advantage of the present invention, as compared to the prior art, is the realization of a low-cost optical signal detection system with increased signal detection capacity.

The invention will now be further described in connection with the enclosed drawings.

FIG. 4 shows further signal curves, according to the present invention.

Figure 1:
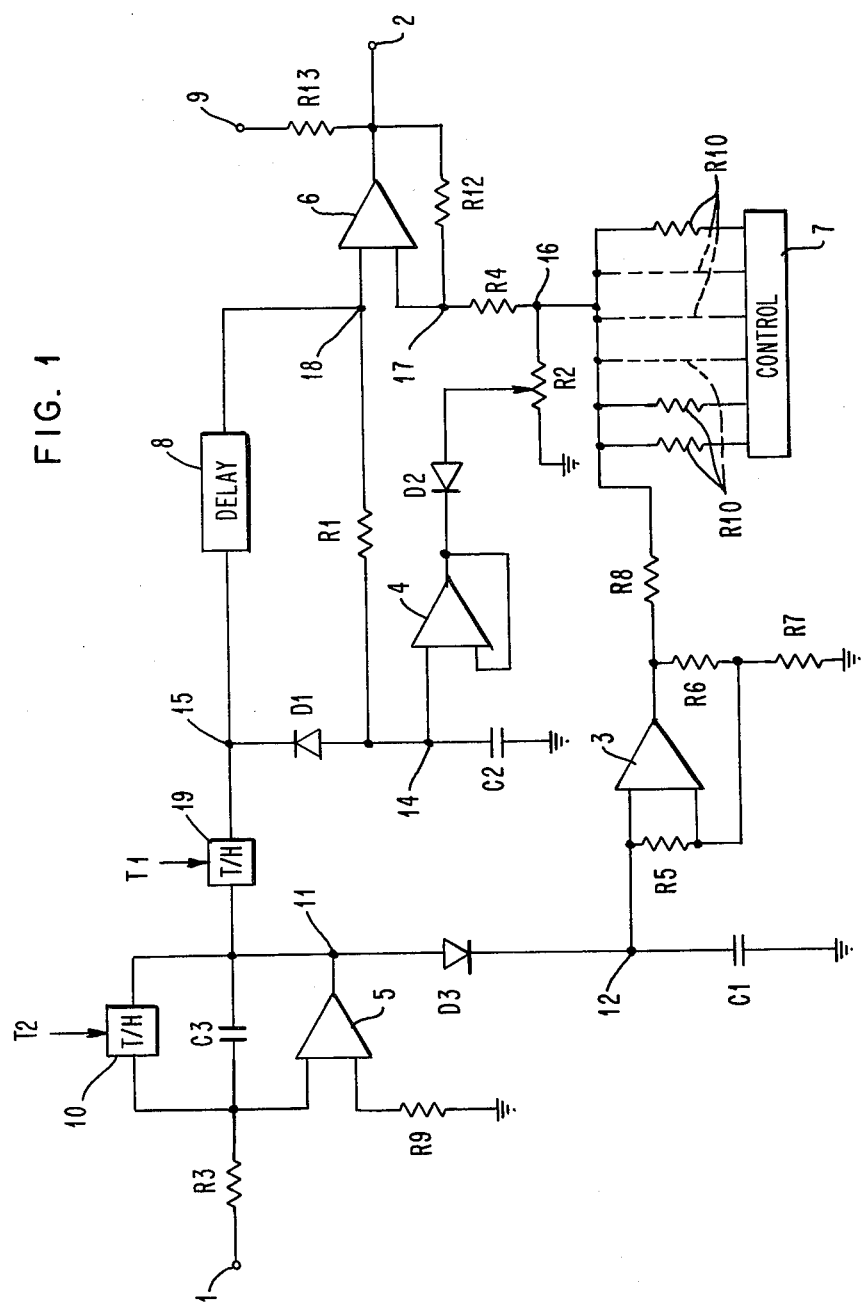
FIG. 1 shows a video signal detector, according to the present invention.

As seen in FIG. 1, the input terminal 1 receives an analog video signal from a photomultiplier tube or from the output of an array of light-detecting diodes (not shown). The input 1 is connected through a resistor R3 to a first input of an input amplifier 5, as well as to one terminal of a condenser C3. The output from the amplifier 5 that is connected to the second terminal of the condenser C3 is also connected through a diode D3 and a condenser C1 to ground. The second input of the amplifier 5 is connected through a resistor R9 to ground. The common node 12 of the diode D3 and the condenser C1 is connected to the first input of the second amplifier 3. The second input of the amplifier 3 is connected to a common node of two resistors R6 and R7, where the second terminal of R7 is grounded. A resistor R5 is connected through both inputs of the amplifier 3. The output from the amplifier 3 is connected to the second terminal of the resistor R6 and through a resistor R8 to the common node of a number of resistors R10. This common node is connected through a resistor R4 to the threshold signal input 17 of an output comparing amplifier 6. The resistors R10 are connected to a threshold signal level adjusting circuit 7, an example of which is shown in U.S. Pat. No. 4,295,121.

The output from the amplifier 5 is further connected through a test and hold circuit 19 and a delay circuit 8 to the first input 18 of the output amplifier 6. The output 15 from the test and hold circuit 19 is also connected through a backbiased diode D1 and a condenser C2 to ground. The common node 14 of diode D1 and condenser C2 is connected through a resistor R1 to the first input 18 of the output amplifier 6, as well as to a first input of a third amplifier 4. The delay circuit 8 together with resistor R1 and condenser C2 impose a voltage across diode D1 as a function of the amount of change between time-spaced samples of the output signal from test and hold circuit 19. The output of the amplifier 4 is fed back to its second input, and is further connected through a diode D2 to the adjustment point of a resistor R2. The output of amplifier 4 responds to black peaks only in high contrast regions where the voltage at 15 goes sufficiently low to bring node 14 below a threshold enabling diode D2 to conduct. In low contrast regions, where the signal at node 15 changes by small amounts, the voltage at node 14 maintains a back bias on diode D2 that keeps the black peak signal at node 15 from entering into the threshold network that produces the threshold signal at node 17. One terminal of the resistor R2 is connected to ground, and the second terminal is connected to the common node 16 of resistors R4 and R10.

The output from the output amplifier 6 is connected to an output terminal 2, is further fed back through a resistor R12 to its second input 17, and is connected through a resistor R13 to a potential supply terminal 9. A switch 10 is connected between the two terminals of condenser C3 in order to selectively short circuit the condenser C3. Switch 10 and test and hold circuit 19 are controlled respectively by external timing signals T2 and T1, respectively, to produce periodically changing level signal C, FIG. 4. Time T1 occurs just prior to time T2.

The video signal detector circuit, according to FIG. 1, comprises an inverting integrator in the form of the amplifier 5, the condenser C3 and the resistor R9. The diode D3 and the condenser C1 form together a white level peak detector, and the diode D1 and the condenser C2 form a black level peak detector. The adjustable resistor R2 forms an adjustable device, defining the share of the white signal peak and black signal peak, which contributes to setting the threshold signal level at the second input terminal 17 of the output amplifier 6.

Figure 2:
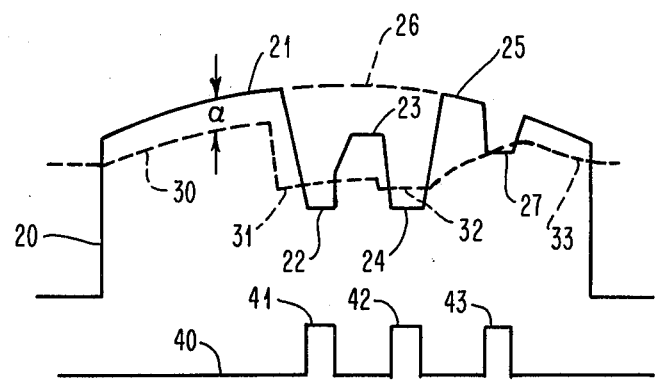
FIG. 2 shows signal curves for detecting video signals of high contrast of the image with respect to the background.
Figure 3:
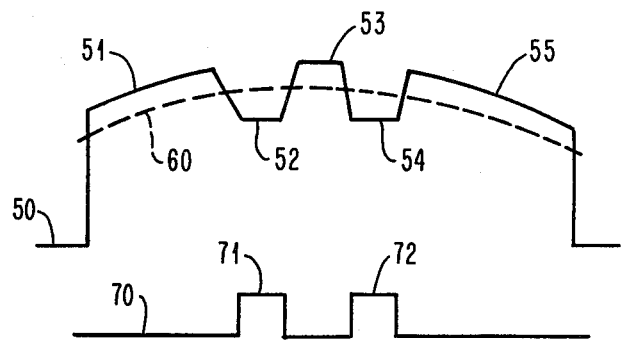
FIG. 3 shows signal curves for detecting video signals of low contrast of the image with respect to the background.

The function of the video signal detector circuit, shown in FIG. 1, will now be described, first in connection with the diagram of FIG. 2 showing signal curves for high contrast signals, and later with reference to the diagram of FIG. 3, showing signal curves for low contrast signals.

FIG. 2 shows the curve 20 which is the delayed video signal that appears at the input terminal 18 of the output amplifier 6. This signal corresponds to the input signal at the terminal 1 and differs from said input signal because the amplifier 5 has integrated the input signal and the test and hold circuit 19, as well as the delay circuit 8, has delayed the signal a certain time. The curve 30 of FIG. 2 corresponds to the threshold level signal curve that appears at the second input terminal 17 of the output amplifier 6. The curve 40 of FIG. 2 shows the detected data signal curve that appears at the output terminal 2.

FIG. 2 shows an assumed arriving video signal which, after integration, changes from a low value to a high value that corresponds to the detection of a white area on the document. This high value is represented by the curve portion 21 on the video signal curve 20. The condenser C1 of the white peak detector is then charged, and the voltage level at the terminal 12 slowly rises to a maximum value at point 26. The signal level at the terminal 17 will rise as well, as is shown by the first portion of curve 30. During this interval, the signal level at the terminal 18 is higher than the signal level at the terminal 17, as is shown in FIG. 2, by the distance "a" between the curve portion 21 and the beginning of the curve 30. This threshold level difference is set by means of the adjustable circuit 7 through selectively activating the adjustable resistors R10.

It should be noted that the threshold curve 30 should have the same slope as the video signal curve portion 21 in order for a constant threshold value "a" to be maintained. This slope is a result of the characteristics of the optical components and their location in the detector device, the threshold compensation being controlled or programmed in the circuit 7.

When the detector device of the document reader switches from a white area to a black area, the input video signal curve will fall from the high value 21 to a low value 22, as shown in FIG. 2. The condenser C2 of the black peak detector will then be discharged to a signal level that corresponds to the black peak of the curve portion 22. Since the signal level 22, appearing at node 15, is sufficiently low (highly negative), the diode D2 will not be backbiased any more, and the signal level at the terminal 17 falls, as shown by the curve portion 31. It is seen that the threshold signal level at point 17 falls earlier than the video signal level at the terminal 18 which is due to the influence of the delay circuit 8. As the threshold level now is higher than the video signal level at the input of the output amplifier 6, an output signal will appear on the output terminal 2, as shown by the curve portion 41 of the output signal 40, FIG. 2.

It is now assumed that the input video signal rises to a value represented by the curve portion 23, which is considerably lower than the normal white video signal input represented by the signal level 21. Thanks to the influence of the black peak detector, the threshold signal at the terminal 17 will still have a low value, and the output signal at the terminal 2 will fall to its low value. After that, the video signal is assumed to fall again to a low value, as represented by the curve portion 24. The threshold signal at the terminal 17 will once again be higher than the video signal input at the terminal 18, and the result is another output signal at the terminal 2. This is shown by the curve portion 42 of the output signal 40.

FIG. 3 shows the same signal curves as FIG. 2, but the contrast is low between the background and the character information on the detected document. The video signal curve 50 appears, to begin with, as a white signal, portion 51 corresponding to the signal curve portion 21 of FIG. 2. The threshold signal curve 60 corresponds to the threshold signal curve 30 of the FIG. 2. When a dark area appears on the document, the video signal falls from the curve portion 51 to the curve portion 52. It should be observed that this signal level fall is much less pronounced due to the low contrast, as compared to the corresponding signal level fall from curve portion 21 to curve portion 22 of FIG. 2. If the threshold signal 60 had shown the same fall as in FIG. 2, the detection of the black peak of the curve portion 52 would be uncertain. From FIG. 1, it is seen, however, that the black peak detector will not be activated at comparatively high (small negative) signal levels, due to the fact that the diode D2 is biased. The threshold level at the terminal 17 will thus not be influenced by the black peak detector, but only by the white peak detector, so no jumps will occur in the threshold level signal curve 60 of FIG. 3.

When the video signal level of the curve portion 52 falls below the threshold level, on output signal, in the form of a signal portion 71, appears at the output terminal 2 of the output signal 70. In the same way, an output signal appears at the signal portion 72 of the output signal 70 when the video signal at the curve portion 54 again falls below the threshold level. Between the two output signals 71 and 72, a video signal portion 53 appears, having a higher value than the threshold level, which has the result that the output signal 70 has a low value between pulses 71 and 72. After that, the video signal regains its high value with the curve portion 55.

The feedback resistor R12 is used to lock or stabilize the output signal on terminal 2 in order to avoid output signal oscillations when the signal levels of the input terminals 17 and 18 cross each other.

It is seen above that the video signal detector, according to FIG. 1, is able to detect high, as well as low, contrast signals. It should be noted that if a high contrast signal suddenly appears inbetween a number of low contrast signals, according to FIG. 3, the black peak detector of FIG. 1 will immediately be activated and a correct signal detection will be achieved. Even single low-contrast signals that are mixed with high contrast signals 22, 24, according to FIG. 2, can most often be detected successfully. This is due to the fact that the condenser C2 is charged through the resistor R1 to a value high enough for the diode D2 to be able to stop the influence of the black peak detector on the threshold level 33. The pulse 43 shows the detected data pulse.

It is thus seen that the circuit, according to FIG. 1, is able to consider all possibilities of black/white contrast for the input video signal. By suitable setting of the adjustable resistance R2 and the control means 7, a dynamic threshold level curve is achieved that provides a maximum detection of video signals at the same time as noise signals are eliminated.

According to an embodiment of the invention, the signal level indicated by the curves A–F of FIG. 4 are used in the detector circuit, according to FIG. 1.

The curve A illustrates the input video signal at the terminal 1, the individual pulses A1–A6 having a maximum amplitude of −7 V and a pulse interval of 5 micro seconds. The curve B, disclosing the individual signals B1–B6, illustrates the integrated video signal at the terminal 11, and the curve C, having the individual signals C1–C6, shows the video signal after the test and hold circuit 19 at the terminal 15. The curve E, having the signals E1–E6, indicates the signal level at the terminal 18 and corresponds substantially to the curve C except for the delay K that is caused by the delay circuit 8. The output signal F, at the terminal 2, is represented by two pulses F3 and F5 of amplitude +5 V for TTL-logic.

The various elements of FIG. 1, such as the amplifiers 3, 4, 5, and 6, the delay circuit 8, the test and hold circuit 19, the switch 10 and the control means 7, are well known in the art and will not be described in detail.

I claim:

1. A video signal detector for converting analog video signals representing optical reflectance from successive small regions on a document into a digital output signal comprising
    means for producing an analog video signal that varies in magnitude as a function of optical reflection,
    means responsive to said video signal for developing a white level peak representative voltage signal,
    means responsive to said video signal for developing a black level peak representative voltage signal,
    means responsive to said white level peak representative signal and said black level peak representative signal for developing a threshold level voltage signal,
    comparing means responsive to said video signal and to said threshold level signal for producing a digital output signal,
    a diode connected between said black level peak signal developing means and said threshold level signal developing means, said diode being oriented to permit conduction in the presence of black level voltage signals, and
    means supplying back bias to said diode for preventing conduction therethrough in the presence of relatively small black level voltage signals but permitting conduction therethrough in the presence of relatively large black level voltage signals.

2. A video signal detector, as defined in claim 1, wherein said video signal producing means comprises signal integrating means having an output connection and time-controlled switch means for periodically resetting said output to a starting value whereby periodic integrated video signals are provided.

3. A video signal detector, as defined in claim 1, wherein said white level peak representing signal producing means comprises a diode and a condenser that are connected in series with said video signal producing means, and means connecting a point intermediate said diode and said condenser to said threshold level signal developing means.

4. A video signal detector, as defined in claim 1, wherein said black level peak representing signal producing means comprises a condenser and a diode that are connected in series through a test and hold circuit to said video signal producing means.

5. A video signal detector, as defined in claim 4, wherein the test and hold circuit is connected through a delay circuit to the output comparator and through a resistor to a point between said condenser and said diode of said black level peak representing signal producing means.

6. A video signal detector, as defined in claim 1, wherein said threshold level signal developing means comprises adjustable means for controlling the black level peak share and the white level peak share of the threshold level signal.

7. A video signal detector, as described in claim 1, wherein said comparing means includes an amplifier having a first input for receiving said video signal, a second input for receiving said threshold level signal, an output for delivering a digital output signal, and a feedback connection between said second input and said output to stabilize the output signal.

* * * * *